United States Patent Office 3,226,583
Patented Dec. 28, 1965

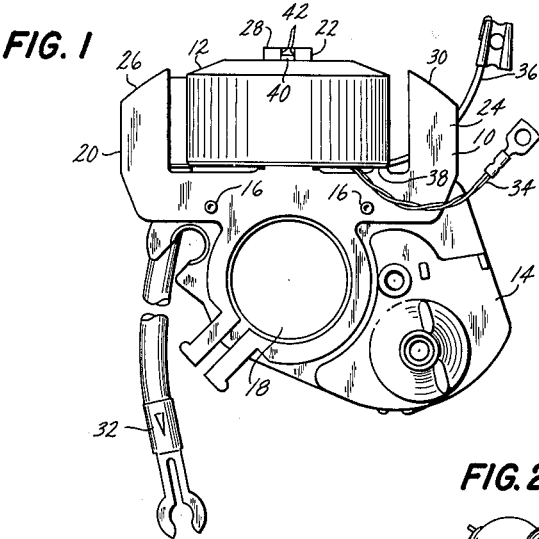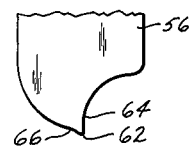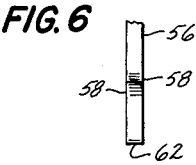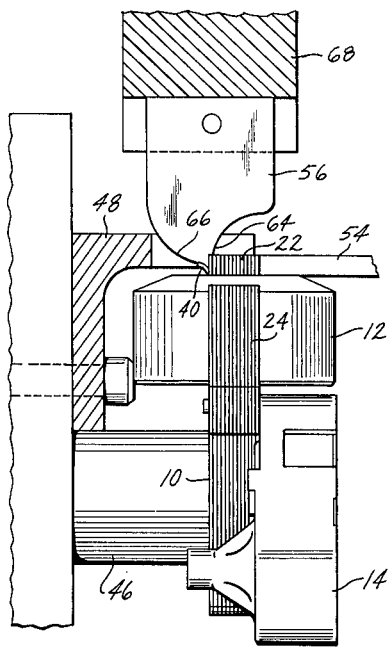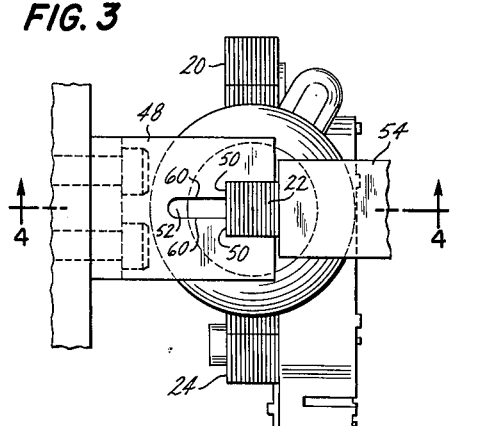

3,226,583
METHOD AND MEANS FOR SECURING AN ARTICLE TO A LAMINATED CORE
George E. Espe, Springfield, Mass., assignor to R. E. Phelon Company, Incorporated, East Longmeadow, Mass., a corporation of Massachusetts
Filed July 31, 1961, Ser. No. 128,143
12 Claims. (Cl. 310—153)

This invention relates to devices comprising assemblies of apertured articles, such as electrical coils, and laminated supporting structures, and deals more particularly with an improved method and means for securing an article such as aforesaid to the laminated structure.

The improved method and means of this invention find particular utility in connection with various electromagnetic devices, such as relays, motors, generators and the like, having a flux carrying iron structure which is laminated to reduce hysteresis and eddy current losses and also having electrical coils or other articles secured to the iron structure. For the purpose of illustration the invention is shown herein as applied to a magneto coil and core assembly generally similar to that shown in the patent to R. E. Phelon, Number 2,847,490, and to which patent reference is made for a disclosure of the details of the magneto mechanism not shown herein. It is to be understood however that, at least in its broader aspects, the invention is not limited to magnetos or other electromagnetic devices and that it extends to other different assemblies involving the securement of one apertured article to another laminated article.

The general object of this invention is to provide a simple, efficient and low cost method for securing an apertured article to a laminated core without the use or need for any separate fasteners or retaining means.

A more particular object of the invention is to provide an improved method and means for axially retaining an electrical coil, or other similar apertured article, in place on a laminated pole of a magneto or the like.

Another object of this invention is to provide a method for securing an apertured article to a corresponding laminated pole by means of a retaining tab cut and bent from one of the end laminations and in which method the formation of the tab is so done as to prevent spreading or separation of the laminations and so as to assure proper cutting and bending of one lamination only by a tab forming machine despite variations in the overall thickness of the lamination pack.

Other objects and advantages of the invention will be apparent from the following description and from the drawings forming a part thereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a front elevational view of a magneto coil and core assembly including a coil retaining tab in accordance with the present invention.

FIG. 2 is a top view of the magneto coil and core assembly of FIG. 1.

FIG. 3 is a view similar to FIG. 2 but shows the coil and core assembly mounted in the holding fixture of a tab forming machine, the core being shown prior to the formation of the tab.

FIG. 4 is a side view of the apparatus shown in FIG. 3 with part of the forming machine being shown in vertical section along the line 4—4 of FIG. 3 and with the forming tool being shown at the bottom of its tab-forming stroke.

FIG. 5 is a side view of the forming tool of FIG. 4.

FIG. 6 is a front view of the forming tool of FIGS. 4 and 5.

Referring now to the drawing, and more particularly to FIGS. 1 and 2 thereof, the invention is shown as applied to a magneto coil and core assembly. The illustrated coil and core assembly constitutes a part of a magneto stator and comprises a laminated core structure 10, a coil unit 12, and a housing 14. The core structure 10 constitutes a magnetic flux carrying member and, accordingly, as best shown in FIG. 2, is fabricated from a plurality of flat laminations of magnetic metal all substantially identical in shape and in face to face contact with each other. The housing 14 is attached as by rivtes 16, 16 to the core structure 10, with the rivets also serving to hold together the various laminations of the core structure. Both the housing and the core structure are provided with a circular opening 18 which is used to mount the illustrated assembly to other fixed structure of the magneto. In use the housing 14 serves to contain the breaker points and other parts of the magneto.

The core structure 10 is so shaped and arranged as to define three poles 20, 22 and 24 having end faces 26, 28 and 30 respectively. The middle pole 22 extends generally radially outwardly with respect to the axis of the opening 18, while the other two poles 26 and 30 are arranged in generally parallel spaced relationship to the middle pole. The end faces 26, 28 and 30 are arcuate and concentric with the axis of the opening 18 and serve to cooperate with a magnet carried by a rotor rotatable about said latter axis.

The coil unit 12 is of conventional construction and consists of a plastic shell or housing containing primary and secondary electric coils held in the shell by a potting or impregnating material. Attached to the coil unit are various electrical conductors indicated at 32, 34 and 36 for making electrical connection with the coils. The coil unit 12 has a central opening which corresponds in general to the shape of the center pole 22. The latter pole passes through the opening in the coil unit and the coil unit and pole are of such relative sizes that the pole extends outwardly for some distance beyond the outer end of the coil unit as shown in FIG. 1. Adjacent the inner end of the pole 22 the core structure 10 is provided with means, such as the raised area shown at 38, for defining a seat which engages the inner end of the coil unit to limit the extent to which the coil unit may be moved inwardly on the pole 22.

In accordance with the present invention, the coil unit 12 is held axially in place on the pole 22 and against the seat 38 by means of a retaining element formed on one of the end laminations of the pole 22 and on that portion of the pole which extends outwardly beyond the coil unit. As shown in FIGS. 1 and 2, this retaining element comprises a tab 40 which is cut from the end lamination facing the viewer in FIG. 1. The tab 40 is generally rectangular in shape and is formed by two transversely spaced and axially extending cuts in the associated end lamination, which cuts extend from the outer end of the pole 22 inwardly to the outer end of the coil unit 12. At the inner ends of the cuts, or adjacent the outer end of the coil unit 12, the material between the two cuts is integral with the remaining portion of the associated end lamination and the material is bent laterally outwardly along a bend line passing transversely between the inner ends of the cuts so that the tab extends laterally outwardly into engagement with the outer surface of the coil unit and prevents the latter from moving axially outwardly beyond the tab. The two lines along which the cuts are made are shown at 42, 42 in FIG. 1, and these two cuts define the two side edges 44, 44 of the tab as shown in FIG. 2. Although FIGS. 1 and 2 show only one tab 40 formed in the associated end lamination, it is to be understood that if desired two or more such tabs could be provided without departing from the invention. It will also be noted that the tab 40 serves as an effective means for holding the coil unit 12 in place on the pole 22 and that it makes use of the available pole material without requiring any additional fasteners.

Another feature of the retention provided by the tab 40 is that the tab may be formed by relatively simple methods. According to the broader method aspects of this invention, the coil unit 12 is secured to the pole 22 by first placing the coil unit on the pole and by then cutting the tab 40 from that portion of one end lamination which extends beyond the coil unit and bending the tab laterally outwardly so as to engage the outer end of the coil unit. The cutting is preferably done in such a manner as to form two transversely spaced and axially extending cuts such as those shown at 42, 42 which cuts extend from the outer end of the pole to the outer end of the article, and the bending is done in such a manner that the material between the two cuts is bent laterally outwardly along a line passing between the inner ends of the two cuts.

The cutting and bending of the lamination material involved in the formation of the tab may be carried out in various different manners, but preferably it is accomplished by forcing a wedge-shaped tool between the end lamination and the next lamination so that the material of the end lamination is displaced laterally outwardly, the tool being so shaped as to simultaneously cut and bend the material. During this use of the tool, the lamination pack comprising the pole 22 is preferably squeezed by means of a clamping pressure applied between the two end laminations adjacent that portion of the pole which extends beyond the coil unit 12. This assures that there will be no tendency for the laminations to separate through the use of the tool.

The clamping pressure applied to the pole during the tab forming process may be applied by a holding fixture such as shown in FIGS. 3 and 4 and which fixture comprises part of a tab-forming machine. Referring to these figures, the holding fixture includes a mandrel 46 and a fixed abutment member 48. The mandrel 46 serves to fit through or into the opening 18 in the core structure to support the core and coil assembly as shown in FIG. 4. The forward end of the fixed abutment 48 has a generally rectangular recess which receives the outer end portion of the pole 22 when the core structure is properly positioned on the mandrel 46. The pole 22, however, extends a slight distance forwardly, or to the right in FIG. 3, beyond the forward edge of the abutment 48. The rear portion of the recess in the abutment defines two coplanar abutment surfaces 50, 50 which engage the left-hand end lamination of the pole 22 and which are separated by a notch 52. The notch 52 is therefore aligned with a transverse portion of the left-hand end lamination and this transverse portion is that used to form the tab 40. To apply the clamping pressure a movable abutment member 54 is moved by suitable means into firm engagement with the right-hand end lamination of the pole 22 along the portion thereof that extends beyond the coil 12 so that the laminations of the pole are squeezed between the abutments 48 and 54.

A suitable wedge-shaped tool for forming the tab 40 in conjunction with the holding fixture of FIGS. 3 and 4 is shown in FIGS. 4, 5 and 6. The tool, indicated generally at 56, is generally flat in appearance as viewed from the front in FIG. 6 and includes two parallel flat side surfaces 58, 58, the transverse thickness of the tool being such that it may pass between the side walls 60, 60 of the notch 52 in the fixed abutment 48. At its lower end the tool has a transverse edge 62. Defining the edge 62 is a forward face 64 which extends generally vertically upwardly from the edge, and a rear face 66 which extends generally rearwardly and upwardly from the edge 62, the faces 64 and 66 giving the tool a wedge-shaped appearance.

In use, the tool 56 is attached to a vertically reciprocating ram 68, comprising part of the tab-forming machine, which operates above the fixed abutment 48. The tool 56 is so positioned on the ram 68 that the transverse edge 62 is disposed and moved in the plane separating the left-hand end lamination of the pole 22 from the next adjacent end lamination. FIG. 4 shows the tool 56 and ram 68 in the end position of the downward stroke of the ram. Before this and while the coil and core assembly are placed in the holding fixture, the ram and tool are held in a raised position. After the coil and core are properly in place in the holding fixture the ram is moved vertically downwardly so that the transverse edge 62 of the tool moves between the left-hand end lamination and the next adjacent lamination. As this movement of the tool occurs it cuts the tab 40 from the end lamination and simultaneously the rear face 66 of the tool acts to bend the tab laterally outwardly into engagement with the coil unit 12. Preferably, the side faces 58, 58 of the tool 56 move in relatively close relationship to the side walls 60, 60 of the notch 52 so as to enhance the shearing of the tab. After the tool 56 is moved to the extreme downward position shown in FIG. 4, it is again moved to its raised position and the completed assembly is taken from the holding fixture.

It will also be noted that the tool serves to cut the tab from the end lamination which is held against the fixed abutment. Therefore, any effect on the tab formation due to variations in the thickness of the lamination pack is eliminated. Only the variations in thickness of one lamination are involved and these are quite small.

The invention claimed is:

1. The combination comprising a core structure having a pole comprised of a plurality of laminations, a coil unit including an outer shell containing at least one coil winding potted therein and having an opening corresponding to the shape of said pole and fitted on said pole with said pole extending through said opening, and a tab cut from one of the end laminations of said pole and bent laterally outwardly therefrom so as to be directly engageable with said coil unit at the corresponding end of said coil unit to prevent the latter from moving axially in one direction on said pole beyond the location of said tab, said tab being otherwise unconnected with said coil unit so as to be incapable of restraining its movement in the opposite axial direction.

2. The combination comprising a core structure having a pole comprised of a plurality of laminations, said laminations having such a shape as to define a seat adjacent one end of said pole located in a plane which intersects said pole along a line generally normal to the faces of said laminations, a coil unit including an outer shell containing at least one coil winding potted therein and having an opening corresponding to the shape of said pole, said article being fitted on said pole with said pole extending through said opening and with one end of said article being in engagement with said seat, and a tab cut from one of the end laminations at the other end of said pole and bent laterally outwardly therefrom so as to engage the other end of said article with the result that said coil unit is held axially in place on said pole between said seat and and said tab, said tab being otherwise unconnected with said coil unit.

3. The combination comprising a core structure having a pole comprised of a plurality of laminations, a coil unit including an outer shell containing at least one coil winding potted therein and having an opening corresponding to the shape of said pole, said coil unit being fitted on said pole with said pole extending through said opening and for some distance beyond the corresponding end of said coil unit, and a tab cut from one of the end laminations of said pole from the portion thereof which extends beyond said coil unit, said tab being bent laterally outwardly from the lamination from which it is cut so as to be directly engageable with said coil unit at the corresponding end of said coil unit to prevent the latter from moving axially on said pole beyond the location of said tab, said tab being otherwise unconnected with said coil unit so as to be incapable of restraining its movement in the opposite axial direction.

4. The combination as defined in claim 3 further characterized by said tab having two axially extending sides cut from said end lamination and a base portion which portion is integral with said end lamination and about which portion said tab is bent to cause the same to extend latterally outwardly from said end lamination, the cuts which form both of said tab sides extending from said corresponding end of said coil unit to the adjacent end of said pole.

5. The combination comprising a core structure having a pole comprised of a plurality of laminations, an article having an opening corresponding to the shape of said pole, said article being fitted on said pole with said pole extending through said opening and for some distance beyond the outer end of said article, and a tab extending laterally outwardly from one of the end laminations of said pole so as to engage the outer end of said article and prevent the latter from moving axially outwardly on said pole beyond the location of said tab, said tab being formed by two transversely spaced and axially extending cuts in said one end lamination which cuts extend axially inwardly from the outer end of said pole to the outer end of said article, the material between said cuts serving to define said tab and being bent relative to said one end lamination adjacent the inner ends of said cuts to cause the same to extend laterally outwardly as aforesaid.

6. A magneto coil unit and core assembly comprising a laminated core structure having a plurality of poles extending generally radially outwardly relative to a given central axis and including a seat located between the radially inner ends of at least two of said poles, a coil unit including a shell containing an electric coil and having a central opening, said coil unit being fitted on one of said poles with said pole passing through said central opening and beyond the outer end of said coil unit with the inner end of said coil unit seated on said seat, and a tab cut and bent laterally outwardly from one of the end laminations of said one pole from the portion thereof which extends beyond said outer end of said shell for holding said coil unit on said one pole between said seat and said tab, said tab being otherwise unconnected with said coil unit.

7. The method of securing an apertured article to a pole of a laminated core structure, with method comprises the steps of providing a laminated core structure having a pole and an article having an opening extending therethrough for receiving said pole, placing said article on said pole so that the pole extends some distance beyond the outer end thereof, engaging a wedge-shaped tool with the outer end of one of the end laminations of said pole, and thereafter pushing said tool axially of said pole and toward said article to cut a tab from said one end lamination and to bend said tab laterally outwardly so as to engage said article and prevent the same from moving axially therebeyond.

8. The method of securing an apertured article to a pole of a laminated core structure, which method comprises the steps of providing a laminated core structure having a pole and an article having an opening extending therethrough for receiving said pole, placing said article on said pole so that the pole extends some distance beyond the outer end thereof, making two transversely spaced and axially extending cuts in one end lamination of said pole which cuts extend from the outer end of said pole to the outer end of said article, and bending the material located between said two cuts along a line passing between the inner ends of said cuts to form a laterally outwardly extending tab which engages the outer end of said article and prevents the same from moving axially therebeyond.

9. The method of securing an apertured article to a pole of a laminated core structure, which method comprises the steps of providing a laminated core structure having a pole and an article having an opening extending therethrough for receiving said pole, placing said article on said pole so that the pole extends some distance beyond the outer end thereof, applying a clamping pressure between the two end laminations of said pole along the portion thereof which extends beyond said article so as to squeeze together the laminations of said pole, and while said clamping pressure is applied forming a retaining element on one of the end laminations of said pole by engaging a wedge-shaped tool between said end lamination and the next adjacent lamination at the outer end of said pole and thereafter forcing said tool axially of said pole and toward said article so as to displace the material of said end lamination laterally outwardly.

10. The method of securing an apertured article to a pole of a laminated core structure, which method comprises the steps of providing a laminated core structure having a pole and an article having an opening extending therethrough for receiving said pole, placing said article on said pole so that the pole extends some distance beyond the outer end thereof, placing the assembly so formed in a holding fixture to bring one end lamination of said pole into engagement with a fixed abutment along the portion thereof which extends beyond said article, moving another abutment into firm engagement with the other end lamination of said pole along the portion thereof which extends beyond said article so as to squeeze the laminations of said pole between said abutments, and while the pole is so squeezed forming a retaining element on said one end lamination by forcing a wedge-shaped tool between said one end lamination and the next adjacent lamination so as to displace the material of said one end lamination laterally outwardly.

11. The method of securing an apertured article to a pole of a laminated core structure, which method comprises the steps of providing a laminated core structure having a pole and an article having an opening extending therethrough for receiving said pole, placing said article on said pole so that the pole extends some distance beyond the outer end thereof, providing a holding fixture having a fixed abutment defining two coplanar abutment surfaces separated by a notch, placing the assembled core and article in said holding fixture in such a manner as to bring one end lamination of said pole into engagement with said two coplanar abutment surfaces along the portion of said pole which extends beyond said article and to bring said notch into alignment with a transverse portion of said one end lamination, moving another abutment into firm engagement with the other end lamination of said pole along the portion thereof which extends beyond said article so as to squeeze the laminations of said pole between said abutments, and while the pole is so squeezed forming a tab on said one end lamination by forcing a wedge-shaped tool between said one end lamination and the next adjacent lamination at the location of said notch so as to displace said transverse portion of said one end lamination laterally outwardly into said notch.

12. The method of securing an apertured article to a pole of a laminated core structure, which method comprises the steps of providing a laminated core structure having a pole and an article having an opening extending therethrough for receiving said pole, placing said article on said pole so that the pole extends some distance beyond the outer end thereof, providing a holding fixture having a fixed abutment defining two coplanar abutment surfaces separated by a notch, placing the assembled core and article in said holding fixture with the outer end of said pole facing upwardly and in such a manner as to bring one end lamination of said pole into engagement with said two coplanar abutment surfaces along the portion of said pole which extends beyond said article and to bring said notch into alignment with a transverse portion of said one end lamination, moving another abutment into firm engagement with the other end lamination along the portion thereof which extends beyond said article so as to squeeze the laminations of said pole between said abutments, providing a forming tool having two parallel side faces, a transverse lower edge extending between said side faces, a forward face extending generally vertically upwardly from said lower edge, and a rear face extending rearwardly and upwardly from said lower edge, positioning said tool above the outer end of said pole with said forward face disposed in the plane separating said one end lamination from the next adjacent lamination and facing inwardly toward the other laminations, and thereafter moving said tool vertically downwardly while maintaining said forward face in said plane of separation so as to shear a tab from said one end lamination and to bend the same laterally outwardly by engagement of said tab with said rear face of said tool.

References Cited by the Examiner
UNITED STATES PATENTS

| | | | |
|---|---|---|---|
| 2,246,890 | 6/1941 | Miller | 336—210 X |
| 2,380,203 | 7/1945 | Tognola | 336—210 X |
| 2,586,320 | 2/1952 | Ford | 29—155.58 |
| 2,764,802 | 10/1956 | Feiertag | 29—155.58 |
| 3,031,593 | 4/1962 | Cametti | 310—214 |
| 3,032,671 | 5/1962 | Daugherty | 310—214 |

FOREIGN PATENTS

| | | |
|---|---|---|
| 847,425 | 9/1960 | Great Britain. |
| 352,735 | 4/1961 | Switzerland. |

ORIS L. RADER, *Primary Examiner.*

DAVID X. SLINEY, *Examiner.*